United States Patent
Moskovich et al.

(10) Patent No.: US 9,398,802 B2
(45) Date of Patent: Jul. 26, 2016

(54) METHOD OF FORMING A HEAD PLATE AND FORMATION OF ORAL CARE IMPLEMENT USING THE SAME

(75) Inventors: Robert Moskovich, East Brunswick, NJ (US); Michael Rooney, Millburn, NJ (US)

(73) Assignee: COLGATE-PALMOLIVE COMPANY, New York, NY (US)

( * ) Notice: Subject to any disclaimer, the term of this patent is extended or adjusted under 35 U.S.C. 154(b) by 35 days.

(21) Appl. No.: 14/385,354

(22) PCT Filed: Mar. 9, 2012

(86) PCT No.: PCT/US2012/028459
§ 371 (c)(1),
(2), (4) Date: Sep. 15, 2014

(87) PCT Pub. No.: WO2013/133848
PCT Pub. Date: Sep. 12, 2013

(65) Prior Publication Data
US 2015/0033487 A1    Feb. 5, 2015

(51) Int. Cl.
*A46B 9/06* (2006.01)
*B29C 45/14* (2006.01)
(Continued)

(52) U.S. Cl.
CPC .............. *A46B 9/06* (2013.01); *A46B 5/0025* (2013.01); *A46B 9/04* (2013.01); *A46D 3/00* (2013.01); *A46D 3/005* (2013.01);
(Continued)

(58) Field of Classification Search
CPC .......... A46B 9/06; A46B 5/0025; A46B 9/04; A46D 3/00; A46D 3/005; B29C 45/0017; B29C 45/14336
See application file for complete search history.

(56) References Cited

U.S. PATENT DOCUMENTS

| 1,632,859 A | 6/1927 | Straehly |
| 1,968,303 A | 7/1934 | McMath |

(Continued)

FOREIGN PATENT DOCUMENTS

| DE | 20109123 | 5/2001 |
| DE | 202005009026 | 6/2005 |

(Continued)

OTHER PUBLICATIONS

International Search Report and the Written Opinion issued in International Application PCT/US2012/28459 mailed Dec. 3, 2012. WO.

(Continued)

*Primary Examiner* — Shay Karls

(57) ABSTRACT

A method of forming a head plate for enhanced cleaning action during brushing. In one embodiment, the invention can be a method of forming a head plate comprising: a) forming a mounting plate comprising a first section and a second section, the first section separated from the second section by a gap, a groove formed into the second section that extends from the gap to a cleaning element location; b) positioning the mounting plate in a mold cavity; c) injecting a molten resilient material into the mold cavity so that the molten resilient material: (1) flows into the gap; (2) flows into the groove; and (3) flows into a cleaning element chamber; and d) solidifying the molten resilient material, the solidified resilient material in the gap coupling the first and second sections of the plate together, the solidified resilient material in the cleaning element chamber forming a first resilient tooth cleaning element.

40 Claims, 12 Drawing Sheets

(51) Int. Cl.
*A46B 5/00* (2006.01)
*A46D 3/00* (2006.01)
*A46B 9/04* (2006.01)
*B29C 45/00* (2006.01)
*B29C 45/16* (2006.01)
*A46B 3/06* (2006.01)
*A46D 3/04* (2006.01)
*B29L 31/42* (2006.01)

(52) U.S. Cl.
CPC ...... *B29C 45/0017* (2013.01); *B29C 45/14336* (2013.01); *A46B 3/06* (2013.01); *A46B 2200/1066* (2013.01); *A46D 3/045* (2013.01); *B29C 45/1676* (2013.01); *B29L 2031/425* (2013.01)

(56) References Cited

U.S. PATENT DOCUMENTS

| | | |
|---|---|---|
| 2,263,802 A | 11/1941 | Grusin |
| 3,398,421 A | 8/1968 | Rashbaum |
| 4,020,521 A | 5/1977 | Velasquez |
| 4,403,623 A | 9/1983 | Mark |
| 4,520,526 A | 6/1985 | Peters |
| 4,633,542 A | 1/1987 | Taravel |
| 4,654,922 A | 4/1987 | Chen |
| 4,796,325 A | 1/1989 | Bortman |
| 5,054,154 A | 10/1991 | Schiffer et al. |
| 5,228,166 A | 7/1993 | Gomez |
| 5,394,584 A | 3/1995 | Breitschmid |
| 5,491,866 A | 2/1996 | Simonds |
| 5,511,277 A | 4/1996 | Simonds |
| 5,524,319 A | 6/1996 | Avidor |
| 5,735,012 A | 4/1998 | Heinzelman et al. |
| 5,802,656 A | 9/1998 | Dawson et al. |
| 5,839,149 A | 11/1998 | Scheier et al. |
| 5,884,354 A | 3/1999 | Anderson |
| 5,898,967 A | 5/1999 | Wu et al. |
| 5,956,797 A | 9/1999 | Wilson |
| 5,987,689 A | 11/1999 | Gordon |
| 6,006,395 A | 12/1999 | Tiramani et al. |
| 6,066,282 A | 5/2000 | Kramer |
| 6,101,659 A | 8/2000 | Halm |
| 6,408,473 B1 | 6/2002 | Kessler |
| 6,779,851 B2 | 8/2004 | Bouchiere |
| 6,883,200 B1 | 4/2005 | Euler |
| 6,931,688 B2 | 8/2005 | Moskovich et al. |
| 6,988,777 B2 | 1/2006 | Pfenniger et al. |
| 6,990,706 B2 | 1/2006 | Broecker et al. |
| 7,020,928 B2 | 4/2006 | Hohlbein |
| 7,162,767 B2 | 1/2007 | Pfenniger et al. |
| 7,275,277 B2 | 10/2007 | Moskovich et al. |
| 7,383,619 B2 | 6/2008 | Gross et al. |
| 7,480,955 B2 | 1/2009 | Hohlbein et al. |
| 7,574,765 B2 | 8/2009 | Huber et al. |
| 7,614,111 B2 | 11/2009 | Moskovich et al. |
| 7,805,796 B2 | 10/2010 | Winter et al. |
| 7,841,041 B2 | 11/2010 | Moskovich et al. |
| 2001/0013151 A1 | 8/2001 | Gelder et al. |
| 2002/0056197 A1 | 5/2002 | Johnson |
| 2005/0015907 A1 | 1/2005 | Georgi et al. |
| 2006/0195995 A1 | 9/2006 | Moskovich et al. |
| 2007/0204417 A1 | 9/2007 | Russell et al. |
| 2007/0271717 A1 | 11/2007 | Clos et al. |
| 2007/0283519 A1 | 12/2007 | Moss |
| 2008/0086827 A1 | 4/2008 | Waguespack et al. |
| 2008/0147104 A1 | 6/2008 | Gatzemeyer et al. |
| 2008/0235889 A1 | 10/2008 | Lary |
| 2009/0025165 A1 | 1/2009 | Moskovich et al. |
| 2009/0091178 A1 | 4/2009 | Waguespack et al. |
| 2010/0088836 A1 | 4/2010 | Kirchhofer et al. |
| 2010/0092916 A1 | 4/2010 | Teixeira et al. |
| 2010/0313371 A1 | 12/2010 | Kaczmarek |
| 2011/0016651 A1 | 1/2011 | Piserchio |
| 2011/0138563 A1 | 6/2011 | Phgura |
| 2011/0152909 A1 | 6/2011 | Jimenez et al. |
| 2011/0271471 A1 | 11/2011 | Kirsh |

FOREIGN PATENT DOCUMENTS

| | | |
|---|---|---|
| DE | 102006025825 | 6/2006 |
| EP | 0613636 | 9/1994 |
| EP | 1532891 | 5/2005 |
| EP | 2292118 | 3/2011 |
| EP | 2298122 A2 | 3/2011 |
| WO | WO 94/05183 | 3/1994 |
| WO | WO 98/27847 | 7/1998 |
| WO | WO 01/43582 | 12/2000 |
| WO | WO 03/030680 A1 | 4/2003 |
| WO | WO2007/051203 | 5/2007 |
| WO | WO2008/093300 | 8/2008 |
| WO | WO2008/103597 | 8/2008 |

OTHER PUBLICATIONS

Written Opinion of the International Preliminary Examining Authority issued in International Application PCT/US2012/28459 mailed Mar. 13, 2014. WO.

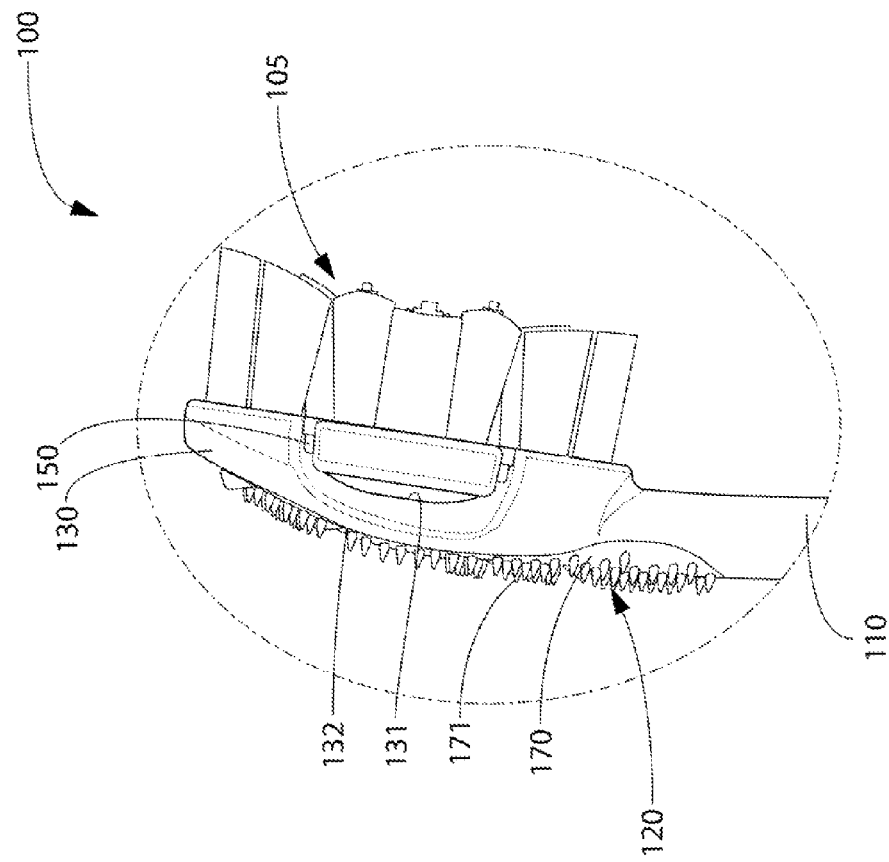
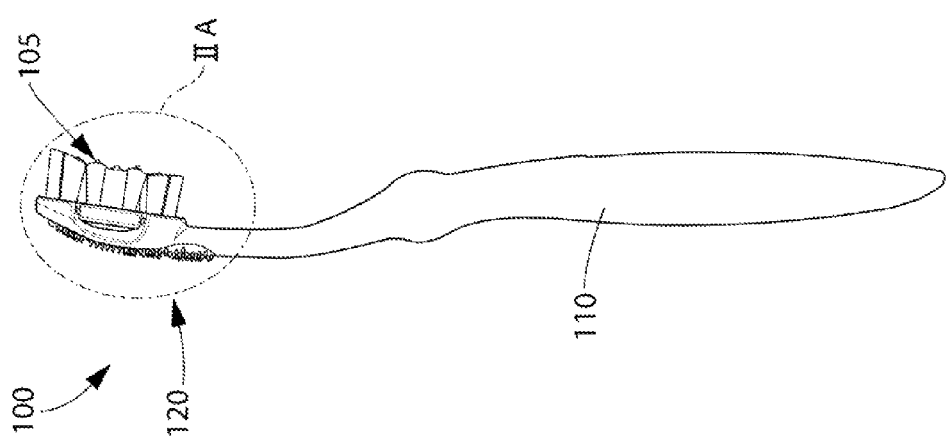

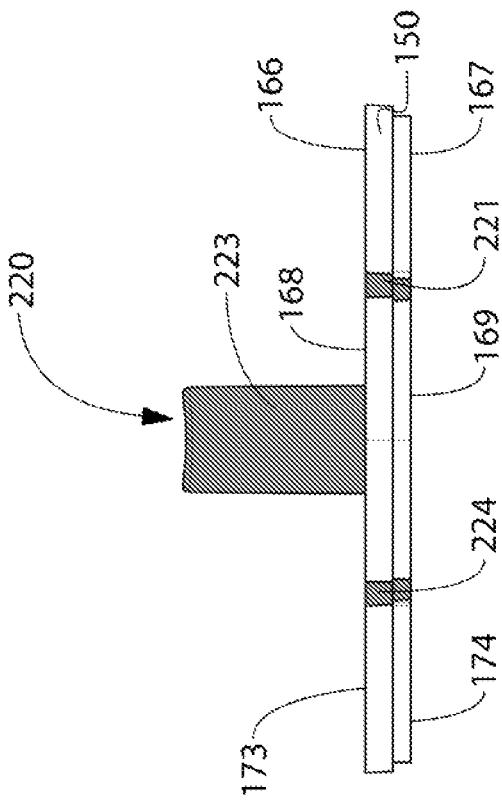
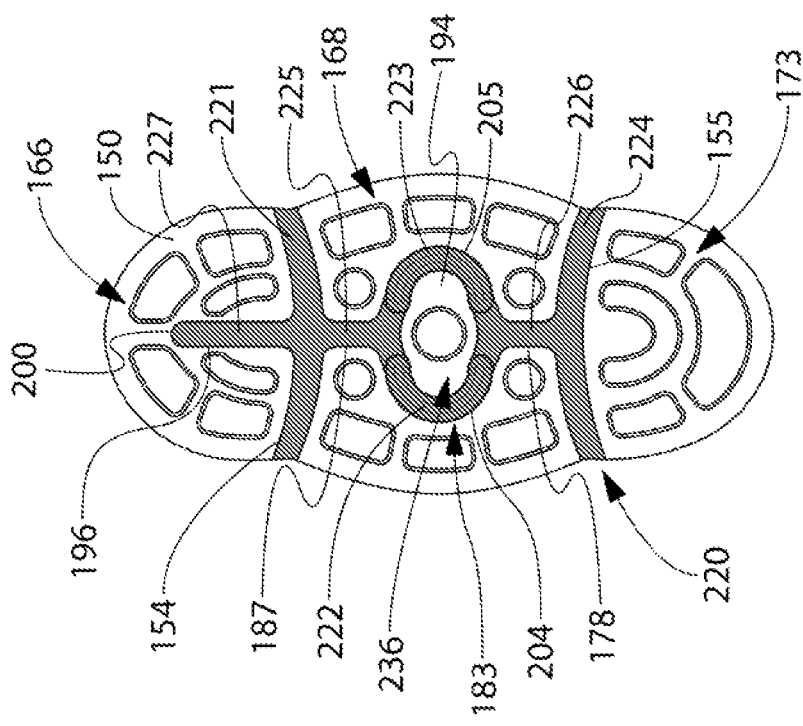
FIG. 5B
FIG. 5A

METHOD OF FORMING A HEAD PLATE AND FORMATION OF ORAL CARE IMPLEMENT USING THE SAME

CROSS-REFERENCE TO RELATED PATENT APPLICATIONS

The present application is a U.S. national stage entry under 35 U.S.C. §371 of Patent Cooperation Treaty Patent Application No. PCT/US2012/28459, filed Mar. 9, 2012, the entirety of which is incorporated herein by reference.

FIELD OF THE INVENTION

The present invention relates generally to oral care implements, and specifically to oral care implements, such as toothbrushes, having a head that achieves an enhanced cleaning action during brushing.

BACKGROUND OF THE INVENTION

A variety of toothbrush head configurations exist that have manually and/or mechanically-driven movable cleaning elements. Many of these configurations, however, include cleaning elements that extend from a rigid head. Teeth and gums by nature have a complex intricate contour. Due to the rigid nature of the attachment of the cleaning elements to the head of the toothbrush, the orientation of the cleaning elements is not flexible. Thus, a need exists for a toothbrush that achieves better flexibility of cleaning elements for an enhanced and improved cleaning action during brushing.

BRIEF SUMMARY OF THE INVENTION

The present invention is directed to an oral care implement and a method of making the same. In one aspect, the method can include forming a head and a handle, and forming a mounting plate that is coupled to the head. The mounting plate has a longitudinal axis and comprises a first section and a second section that are separated by a gap. The second section also comprises a groove. The method includes injecting a molten resilient material onto the mounting plate so that the molten resilient material fills the gap, flows through the groove, and forms a resilient cleaning element extending from the mounting plate.

In one embodiment, the invention can be a method of forming a head plate having one or more tooth cleaning elements, the method comprising: a) forming a mounting plate of a rigid material, the mounting plate comprising a first section and a second section, the first section separated from the second section by a first gap, a first groove formed into a front surface of the second section that extends from the first gap to a cleaning element location of the second section; b) positioning the mounting plate in a mold cavity so that a first cleaning element chamber of the mold cavity is aligned with the cleaning element location; c) injecting a molten resilient material into the mold cavity so that the molten resilient material: (1) flows into the first gap; (2) flows into the first groove; and (3) flows into the first cleaning element chamber; and d) cooling to solidify the molten resilient material, wherein the solidified resilient material in the first gap forms a first resilient hinge that couples the first and second sections of the mounting plate together while the solidified resilient material in the first cleaning element chamber forms a first resilient tooth cleaning element extending from the second section of the mounting plate at the cleaning element location.

In another embodiment, the invention can be a method of forming an oral care implement comprising: a) forming a body comprising an elongated handle and a base structure coupled to a distal end of the elongated handle; b) forming a head plate comprising: a mounting plate formed of a rigid material, the mounting plate comprising a first section and a second section, the first section separated from the second section by a first gap, a first groove formed into a front surface of the second section extending from the first gap to a cleaning element location of the second section; and an integral mass of a resilient material comprising a first resilient hinge in the first gap that flexibly couples the first and second sections together, a first resilient cleaning element extending from the second section at the cleaning element location, and a first resilient strip in the first groove extending between the first resilient cleaning element and the first resilient hinge; and c) coupling the head plate to the base structure, the head plate and the base structure forming a head of the oral care implement.

In yet another embodiment, the invention can be an oral care implement comprising: a handle; a base structure coupled to a distal end of the handle; a head plate comprising: a mounting plate of a rigid material comprising a first section and a second section, the first section separated from the second section by a first gap, a first groove formed into the front surface of the second section extending from the first gap to a cleaning element location on the front surface of the second section; and an integral mass of a resilient material comprising a first resilient hinge in the first gap that flexibly couples the first and second sections of the mounting plate together, a first resilient cleaning element extending from the second section at the cleaning element location, and a first resilient strip in the first groove extending between the first resilient cleaning element and the first resilient hinge; and the head plate coupled to the base structure so that the first section of the head plate is substantially non-movable relative to the base structure and the second section of the head plate is movable relative to the base structure via flexure at the first resilient hinge.

In an even further embodiment, the invention can be a method of forming a head plate having one or more tooth cleaning elements, the method comprising: a) forming a mounting plate of a rigid material having a first groove formed into a front surface of the mounting plate that extends from an injection location to a cleaning element location of the second section; b) positioning the mounting plate in a mold cavity so that a first cleaning element chamber of the mold cavity is aligned with the cleaning element location and an injection port of the mold cavity is aligned with the injection location; c) injecting a molten resilient material into the mold cavity via the injection port so that the molten resilient material: (1) flows into the first groove; and (2) flows into the first cleaning element chamber; and d) cooling to solidify the molten resilient material, wherein the solidified resilient material in the first cleaning element chamber forms a first resilient tooth cleaning element extending from the second section of the mounting plate at the cleaning element location, and the solidified resilient material in the first groove forms a first resilient strip that extends from the injection location to the first resilient tooth cleaning element.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein:

FIG. 2 is a side view of the oral care implement of FIG. 1;

FIG. 2A is a close-up view of area IIA of FIG. 2;

FIG. 5A is a front view of a head plate comprising the mounting plate of FIG. 3A and an integral mass of solidified resilient material after being removed from the mold of FIG. 4;

FIG. 5B is a side view of the head plate of FIG. 5A;

DETAILED DESCRIPTION OF THE INVENTION

Figure 1:
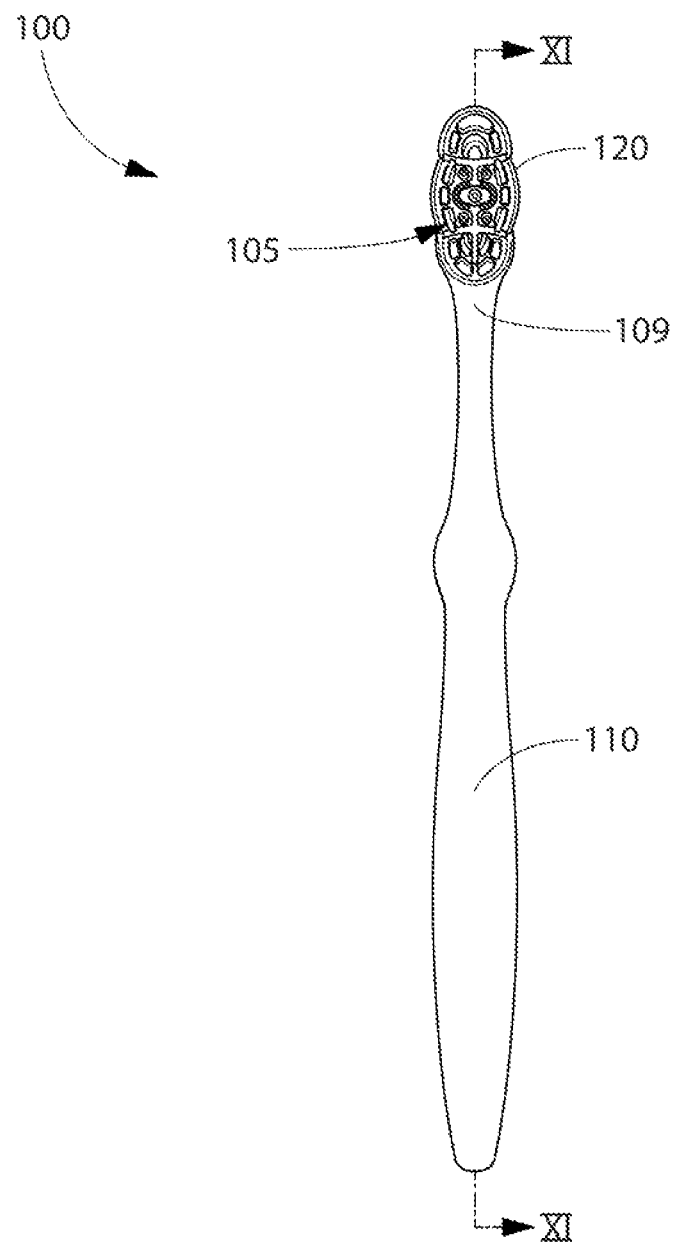
FIG. 1 is a front view of an oral care implement in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIGS. 1-3 concurrently, an oral care implement 100 in accordance with an embodiment of the present invention will be described. In the exemplified embodiment, the oral care implement 100 is in the form of a manual toothbrush. However, in certain other embodiments the oral care implement 100 can take on other forms such as being a powered toothbrush, a tongue scraper, a gum and soft tissue cleaner, a water pick, an interdental device, a tooth polisher, a specially designed ansate implement having tooth engaging elements or any other type of implement that is commonly used for oral care. Thus, it is to be understood that the inventive concepts discussed herein can be applied to any type of oral care implement unless a specific type of oral care implement is specified in the claims.

The oral care implement 100 generally comprises a handle 110 and a head 120. The handle 110 is an elongated structure that provides the mechanism by which the user can hold and manipulate the oral care implement 100 during use. The handle 110 can take on a wide variety of shapes, contours and configurations, none of which are limiting of the present invention. In the exemplified embodiment, the handle 110 is formed of a rigid plastic material, such as for example without limitation polymers and copolymers of ethylene, propylene, butadiene, vinyl compounds and polyesters such as polyethylene terephthalate. Of course, the invention is not to be so limited in all embodiments and the handle 110 may be formed with a resilient material, such as a thermoplastic elastomer, over portions of or the entirety of the handle 110 to enhance the gripability of the handle 110 during use. For example, the handle 110 may include a resilient material in the thumb grip region to increase the comfort to a user when using the oral care implement.

The head 120 is coupled to a distal end 109 of the handle 110. In the exemplified embodiment, the head 120 and the handle 110 are integrally formed as a single unitary structure using a molding, milling, machining or other suitable process. However, in other embodiments the handle 110 and the head 120 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. Whether the head 120 and the handle 110 are of a unitary or multi-piece construction (including connection techniques) is not limiting of the present invention, unless specifically claimed. In some embodiments of the invention, the head 120 may be detachable (and replaceable) from the handle 110 using techniques known in the art.

The head 120 generally comprises a base structure 130 having a front surface 131 and an opposing rear surface 132. A mounting plate 150 is connected to the base structure 130 as will be discussed in more detail below with reference to FIGS. 10-11A. Thus, the head 120 is formed by a combination of the base structure 130 and the mounting plate 150. The mounting plate 150 is used to attach tooth cleaning elements 105 thereto, at which point the mounting plate 150 becomes a head plate. In certain embodiments, the tooth cleaning elements 105 include both bristle tufts and resilient tooth cleaning elements. However, the invention is not to be so limited in all embodiments and in certain other embodiments the tooth cleaning elements 105 can include one of bristle tufts or resilient tooth cleaning elements. The details of the tooth cleaning elements 105 will be described in more detail below.

The rear surface 132 of the base structure 130 comprises a soft tissue cleanser 170 having a plurality of nubs 171 extending outwardly therefrom. The soft tissue cleanser 170 will be described in more detail below with reference to FIGS. 11 and 11A.

Figure 3A:
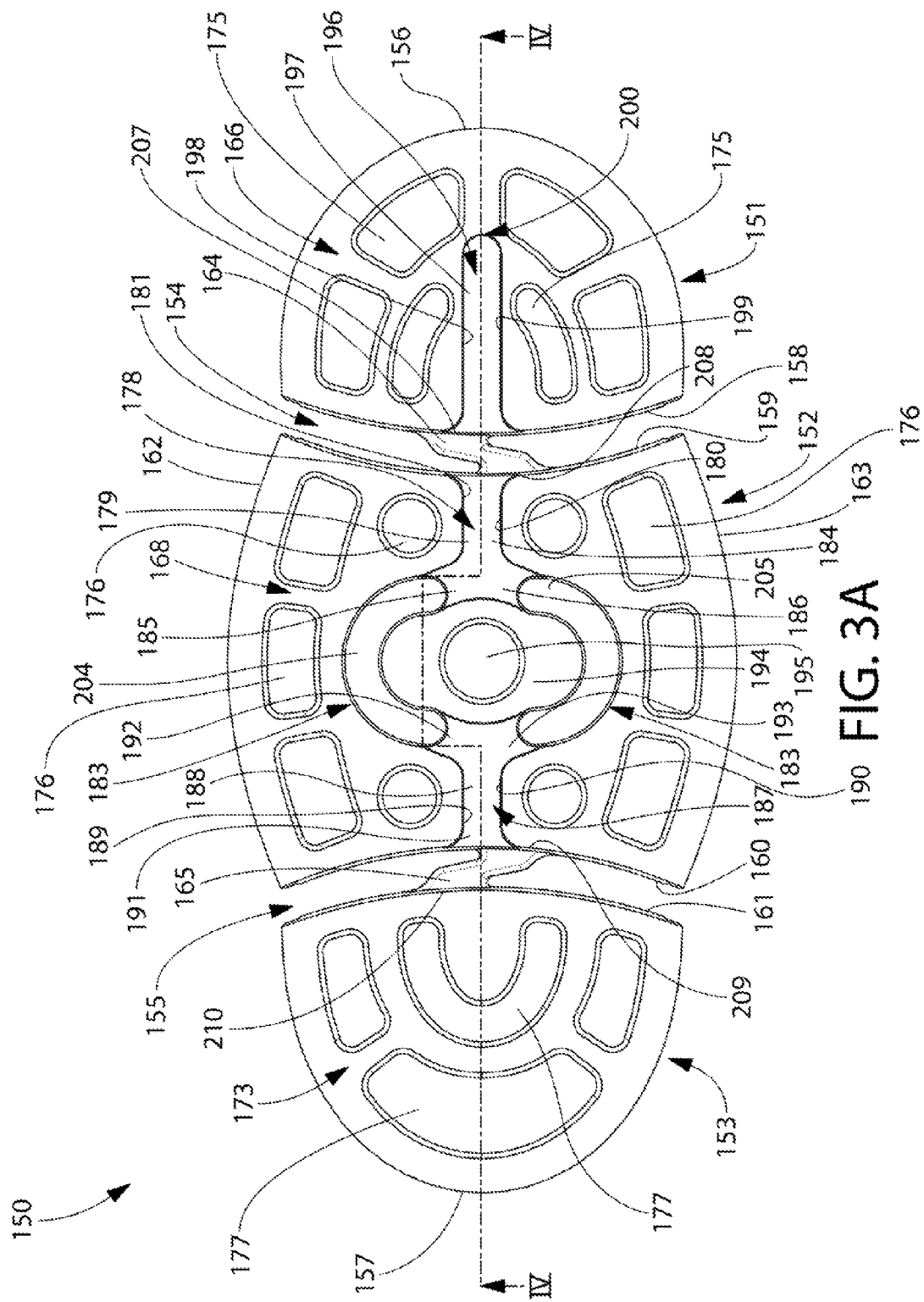
FIG. 3A is a front view of a mounting plate according to an embodiment of the present invention.
Figures 3B, 3C:
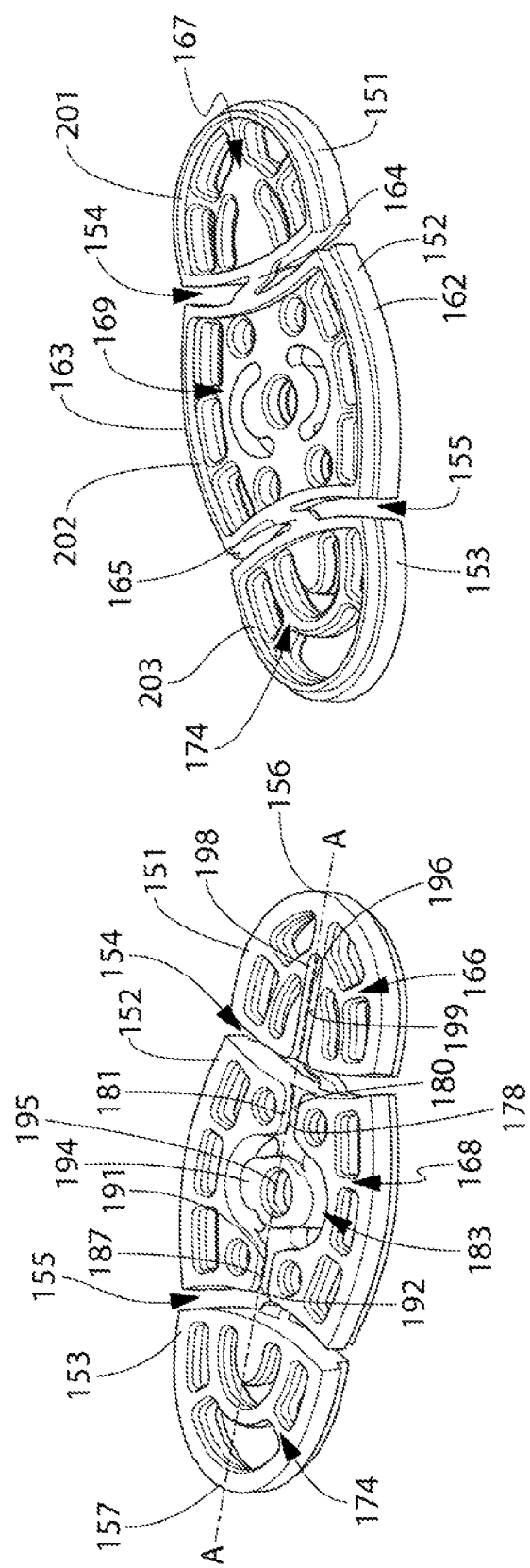
FIG. 3B is a front perspective view of the mounting plate of FIG. 3A.
FIG. 3C is a rear perspective view of the mounting plate of FIG. 3A

Referring to FIGS. 3A-3C, the mounting plate 150 is illustrated removed from the base structure 130 of the head 120 and with the tooth cleaning elements 105 removed from the mounting plate 150. Thus, FIGS. 3A-3C illustrate the mounting plate 150 after formation thereof, but before any tooth cleaning elements or other materials are added and/or connected to the mounting plate 150. The mounting plate 150 is formed of a rigid material, such as one of the hard plastic materials listed above as forming the handle 110. Although described herein as being a rigid material, the mounting plate 150 may have a degree of flexibility in certain embodiments. However, it is desirable that the material that forms the mounting plate 150 be more rigid than a resilient material that is coupled to the mounting plate 150 as will be described in more detail below. Preferably, the mounting plate 150 has a hardness of 80 MPa as measured by the International Organization for Standardization method for determination of hardness for plastics ISO 2039-1:2001.

The mounting plate 150 generally comprises a first section 151, a second section 152 and a third section 153. The second section 152 is positioned between the first and third sections 151, 153 such that the first and third sections 151, 153 are located on opposite sides of the second section 152. Although illustrated and described herein as having three distinct sections, in certain other embodiments the mounting plate 150 may only comprise a first section 151 and a second section 152. The first section 151 of the mounting plate 150 comprises a front surface 166 and an opposing rear surface 167, the second section 152 of the mounting plate 150 comprises a front surface 168 and an opposing rear surface 169 and the third section 153 of the mounting plate 150 comprises a front surface 173 and an opposing rear surface 174.

The first section 151 is separated from the second section 152 by a first gap 154 and the third section 153 is separated from the second section 152 by a second gap 155. Each of the first and second gaps 154, 155 is an open channel that exists between the first and second sections 151, 152 and the second and third sections 152, 153, respectively. Thus, the first gap 154 is formed by a space between a top wall 158 of the first section 151 and a bottom wall 159 of the second section 152. The second gap 155 is formed by a space between a top wall 160 of the second section 152 and a bottom wall 161 of the third section 153. The top wall 158 of the first section 151 and the bottom wall 161 of the third section 153 form convex surfaces. The top and bottom walls 160, 159 of the second section 152 form concave surfaces. Thus, each of the first and second gaps 154, 155 are arcuate shaped spaces extending along the entirety of the width of the mounting plate 150 in locations between the respective sections 151, 152, 153 of the mounting plate 150.

The mounting plate 150 extends along a longitudinal axis A-A from a distal end 156 of the first section 151 to a proximal end 157 of the third section 153. Each of the first and second gaps 154, 155 extend transversely across the entire width of the mounting plate 150 from a first side 162 of the mounting plate 150 to a second side 163 of the mounting plate 150. A first strut 164 extends across the first gap 154 from the top wall 158 of the first section 151 to the bottom wall 159 of the second section 152. Specifically, a first end 207 of the first strut 164 is connected to the top wall 158 of the first section 151 and a second end 208 of the first strut 164 is connected to the bottom wall 159 of the second section 152. The first strut 164 is formed integrally with the first and second sections 151, 152 of the mounting plate 150. A second strut 165 extends across the second gap 155 from the top wall 160 of the second section 152 to the bottom wall 161 of the third section 153. Specifically, a first end 209 of the second strut 165 is connected to the top wall 160 of the second section 152 and a second end 210 of the second strut 165 is connected to the bottom wall 161 of the third section 153. The second strut 165 is formed integrally with the second and third sections 152, 153 of the mounting plate 150. Thus, the entire mounting plate 150 is an integrally formed, unitary structure and the first, second and third sections 151, 152, 153 are connected to one another via the first and second struts 164, 165.

The connection points of each of the first and second struts 164, 165 are offset relative to the longitudinal axis A-A. Specifically, the first end 207 of the first strut 164 is located on an opposing side of the longitudinal axis A-A as the second end 208 of the first strut 164. Similarly, the first end 209 of the second strut 165 is located on an opposing side of the longitudinal axis A-A as the second end 210 of the second strut 165. In the exemplified embodiment, each of the first and second struts 164, 165 are formed by a single piece of material extending across the respective gaps 154, 155. The invention is not to be so limited in all embodiments and in certain other embodiments each of the struts 164, 165 may comprise a plurality of members extending across the gaps 154, 155 from the first section 151 to the second section 152 and from the second section 152 to the third section 153, respectively.

The first section 151 has a plurality of tuft through-holes 175 extending through the first section 151 from the front surface 166 to the rear surface 167. The second section 152 has a plurality of tuft through-holes 176 extending through the second section 152 from the front surface 168 to the rear surface 169. The third section 153 has a plurality of tuft through-holes 177 extending through the third section 153 from the front surface 173 to the rear surface 174. The tuft through-holes 175, 176, 177 are provided for inserting bristle tufts therein as will be discussed in more detail below with reference to FIGS. 7-9. Only a select few of the tuft through-holes 175, 176, 177 are labeled in FIG. 3A in order to avoid clutter and for clarity.

A first groove 178 is formed into the front surface 168 of the second section 152. The first groove 178 is defined by a first floor 179 and two opposing, upstanding sidewalls 180, 181. The first groove 178 extends from the first gap 154 between the first section 151 and the second section 152 to a cleaning element location 183 of the second section 152. In the exemplified embodiment, the first groove 178 comprises a longitudinal portion 184 that extends longitudinally along the length of the second section 152 of the mounting plate 150 and first and second flange portions 185, 186 that extend obliquely from the longitudinal portion 184. Thus, the longitudinal portion 184 and the first and second flange portions 185, 186 collectively form a Y-shaped groove into the second section 152 of the mounting plate 150. The invention is not to be so limited in all embodiments and in certain other embodiments the flange portions 185, 186 may be omitted and the first groove 178 may merely comprise the longitudinal portion 184.

A second groove 187 is also formed into the front surface 168 of the second section 152. The second groove 187 is defined by a second floor 188 and two opposing, upstanding sidewalls 189, 190. The second groove 187 extends from the second gap 155 between the second section 152 and the third section 153 to the cleaning element location 183 of the second section 152. In the exemplified embodiment, the first and second grooves 178, 187 extend along the longitudinal axis A-A from opposite sides of the cleaning element location 183. In the exemplified embodiment, the second groove 187 comprises a longitudinal portion 191 that extends longitudinally along the length of the second section 152 of the mounting plate 150 and first and second flange portions 192, 193 that extend obliquely from the longitudinal portion 191. Thus, the longitudinal portion 191 and the first and second flanges 192, 193 collectively define a Y-shaped groove in the second section 152 of the mounting plate 150. The invention is not to be so limited in all embodiments and in certain other embodiments the flange portions 192, 193 may be omitted and the second groove 187 may merely comprise the longitudinal portion 191.

In the exemplified embodiment, the cleaning element location 183 is located at a central region of the second section 152 of the mounting plate 150. The cleaning element location 183 generally comprises an island 194, a first through-hole 204 and a second through-hole 205. In the exemplified embodiment, each of the first and second through-holes 204, 205 are arcuate shaped holes that extend through the second section 152 of the mounting plate 150 having concave inner surfaces that face one another and are in contact with the island 194. Thus, each of the first and second through-holes 204, 205 are located adjacent the island 194. Furthermore, each of the first and second through-holes 204, 205 are located on opposing sides of the longitudinal axis A-A. The invention is not to be limited by the shape of the first and second through-holes 204, 205 in all embodiments and in certain other embodiments the first and second through-holes 204, 205 can be otherwise shaped.

The first groove 178 is longitudinally spaced from the second groove 187 by the island 194 that is located within the cleaning element location 183. The island 194 comprises a tuft through-hole 195 for receiving a bristle tuft therein. The island 194 is collectively surrounded by the first through-hole 204, the second through-hole 205, the first and second flange portions 185, 186 of the first groove 178 and the first and second flange portions 192, 193 of the second groove 187.

Referring again to the locations of the first and second grooves 178, 187, the first groove 178 extends from the first gap 154 to each of the first and second through-holes 204, 205. More specifically, the longitudinal portion 184 of the first groove 178 extends from the first gap 154 to the flange portions 185, 186, and the first flange portion 185 extends from the longitudinal portion 184 to the first through-hole 204 and the second flange portion 186 of the first groove 178 extends from the longitudinal portion 184 to the second through-hole 205. Similarly, the second groove 187 extends from the second gap 155 to each of the first and second through-holes 204, 205. More specifically, the longitudinal portion 191 of the second groove 187 extends from the second gap 155 to the flange portions 192, 193, and the first flange portion 192 extends from the longitudinal portion 191 to the first through-hole 204 and the second flange portion 193 extends from the longitudinal portion 191 to the second through-hole 205. In certain embodiments, the flange portions of the first and second grooves 178, 187 can be altogether omitted such that the longitudinal portions 184, 191 of the first and second grooves, respectively, extend directly to the first and second through-holes 204, 205.

A third groove 196 is formed into the front surface 166 of the first section 151. The third groove 196 is defined by a third floor 197 and two opposing, upstanding sidewalls 198, 199. The third groove 196 extends from the first gap 154 between the first section 151 and the second section 152 to an injection location 200 on the first section 151. In the exemplified embodiment, the third groove 196 extends longitudinally along the length of the first section 151 of the mounting plate 150 and does not comprise any flange portions as have been described herein above with regard to the first and second grooves 178, 187. Of course, the invention is not to be so limited in all embodiments and the third groove 196 may include flanges in other embodiments.

The injection location 200 is the location on the mounting plate 150 at which a molten resilient material is injected during formation of a head plate utilizing the mounting plate 150. Although the invention is described herein wherein the injection location 200 is located on the third groove 196, the invention is not to be so limited in all embodiments. Thus, in other embodiments the actual injection location may be located at any point on any of the first, second or third grooves 178, 187, 196, at any point within the first or second gaps 154, 155 or at any point within the cleaning element location 183. Thus, the actual location at which the molten resilient material is injected into contact with the mounting plate 150 is not limiting of the present invention unless specifically claimed. Injection of the molten resilient material will be described in more detail below with reference to FIG. 4.

The rear surface 167 of the first section 151 is defined by a first upstanding peripheral wall 201. The first upstanding peripheral wall 201 surrounds the rear surface 167 of the first section 151, thereby creating a basin within which bristle tufts can be melted to the rear surface 167 of the first section 151. The rear surface 169 of the second section 152 is defined by a second upstanding peripheral wall 202. The second upstanding peripheral wall 202 surrounds the rear surface 169 of the second section 152, thereby creating a basin within which bristle tufts can be melted to the rear surface 169 of the second section 152. The rear surface 174 of the third section 153 is defined by a third upstanding peripheral wall 203. The third peripheral wall 203 surrounds the rear surface 174 of the third section 153, thereby creating a basin within which bristle tufts can be melted to the rear surface 174 of the third section 153. Melting of bristle tufts to the rear surfaces 167, 169, 174 of the first, second and third sections 151, 152, 153 of the mounting plate 150 will be described in more detail below with reference to FIGS. 8 and 9.

Figure 4:
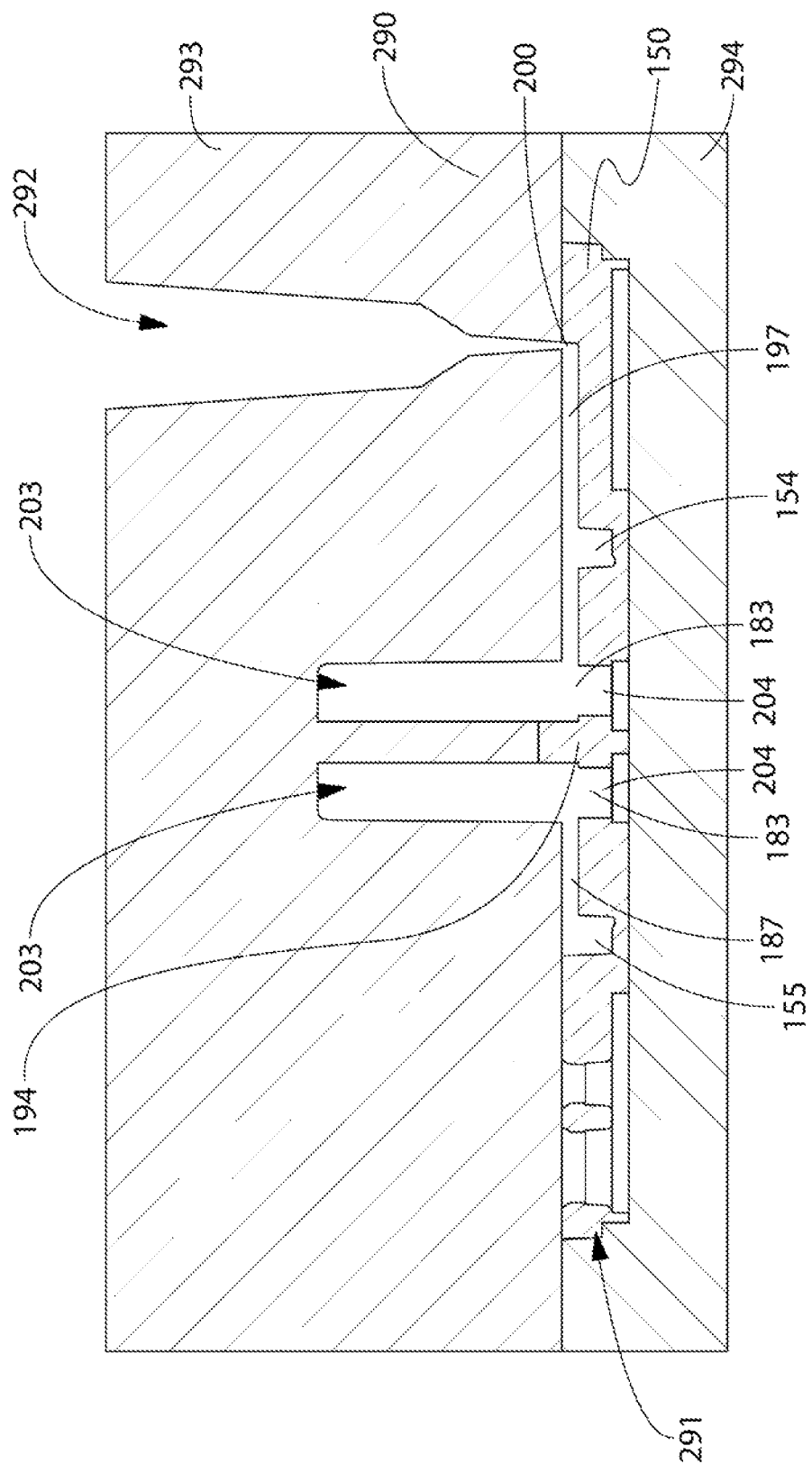
FIG. 4 is a cross-sectional view of the mounting plate of FIG. 3A taken along line IV-IV and positioned within a mold cavity for injecting a molten resilient material into the mold cavity.

Referring to FIGS. 3A and 4 concurrently, the invention will be further described as a method of forming a head plate using the mounting plate 150. The head plate is the mounting plate 150 with tooth cleaning elements. Thus, the mounting plate 150 is converted into a head plate by coupling tooth cleaning elements to the mounting plate 150. FIG. 4 illustrates a cross-sectional view of the mounting plate 150 positioned within a cavity 291 of a mold 290. The mold 290 comprises a top mold half 293 and a bottom mold half 294 that collectively form the mold cavity 291. In the exemplified embodiment, the mold 290 comprises an injection port 292 in the top mold half 212 through which a molten resilient material is injected into the mold cavity 291. Furthermore, the mold 290 comprises a first cleaning element chamber 203 that is aligned with the cleaning element location 183, and more specifically is aligned with the first through-hole 204 of the cleaning element location 183. Although not illustrated, the mold 290 also comprises a second cleaning element chamber that is aligned with the second through-hole 205 of the cleaning element location 183. Each of the first and second cleaning elements chambers 203 are positioned adjacent the island 194.

Upon injecting the molten resilient material into the mold cavity 291, the molten resilient material contacts the mounting plate 150. In the exemplified embodiment, the injection port 292 is aligned with the injection location 200 on the third groove 196 of the first section 151 of the mounting plate 150. However, as described above the injection port 292 can be aligned at other locations along the mounting plate 150 so as to inject the molten resilient material into contact with the mounting plate 150 at other locations. The third groove 196, the first gap 154, the first groove 178, the cleaning element location 183 (i.e., the first and second through-holes 204, 205), the second groove 187 and the second gap 155 collectively define a molten resilient material passageway on the mounting plate 150. The molten resilient material passageway is a single passageway such that each of the third groove 196, the first gap 154, the first groove 178, the cleaning element location 183 (i.e., the first and second through-holes 204, 205), the second groove 187 and the second gap 155 are in fluid communication. Thus, as the molten resilient material is put into contact with the mounting plate 150 at any location along the molten resilient material passageway, the molten resilient material is able to flow along the entirety of the passageway.

Referring to the exemplified embodiment, as noted above the molten resilient material is injected or introduced into the mold cavity 291 at the injection location 200 via the injection port 292. As the molten resilient material is injected into the mold cavity 291 at the injection location 200, the molten resilient material flows into the third groove 197, into the first gap 154, into the first groove 178, into the first cleaning element chamber 203 of the mold cavity 291 that is aligned with the first through-hole 204 of the cleaning element location 183 of the mounting plate 150, into the second groove 155 and into the second gap 187. In addition to flowing into the first cleaning element chamber 203 (and the second cleaning element chamber), the molten resilient material also flows into the first and second through-holes 204, 205, which are in fluid communication with the first and second cleaning element chambers 203.

Of course, the invention is not limited to the particular flow direction recited above, and the flow direction may change if the molten resilient material is injected into the mold cavity 291 at a different location on the mounting plate 150. For example, in certain embodiments the molten resilient material may be injected into the mold cavity at the first gap 154 such that the molten resilient material flows into the first gap 154, flows into the first groove 178 and flows into the cleaning element chamber 203. In the exemplified embodiment, the molten resilient material is injected into the mold cavity 291 in a single injection step and using a single injection point. In other embodiments, a multi-step injection and/or a multi-injection point technique may be used.

After the molten resilient material is injected into the mold cavity 291, the mounting plate 150 is removed from the mold cavity 291 and the molten resilient material is solidified. In certain embodiments, the molten resilient material is made to solidify without removing the mounting plate 150 from the mold cavity 291 such that the molten resilient material is allowed to cool while remaining positioned within the mold cavity 291. Solidifying the molten resilient material is achieved by cooling the molten resilient material. This cooling can be a passive cooling in which the mounting plate 150 with the molten resilient material thereon is simply placed in a room temperature environment and allowed to cool. Alternatively, the cooling can be an active cooling in which the mounting plate 150 with the molten resilient material thereon is positioned within a chilled atmosphere and/or subjected to a forced convective air flow.

Figure 6B:
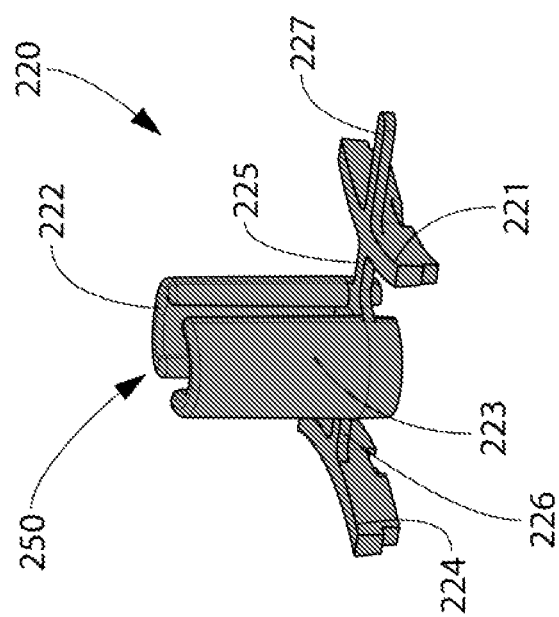
FIG. 6B is a perspective view of the integral mass of solidified resilient material of FIG. 6A.
Figure 6A:
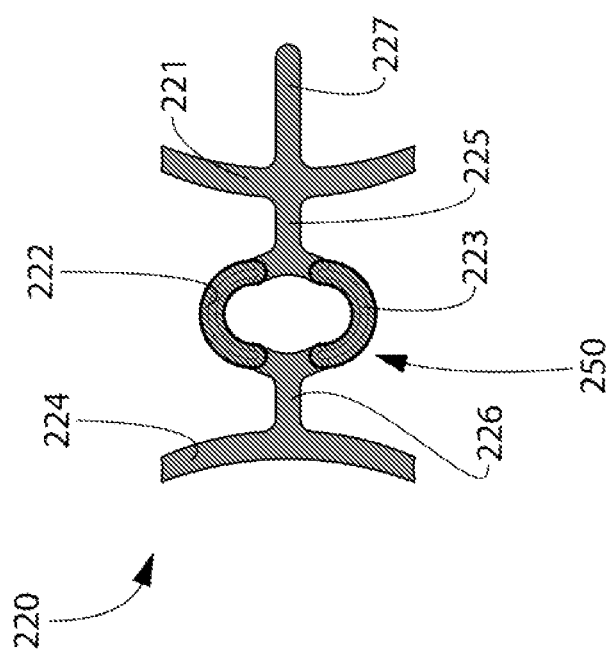
FIG. 6A is a front view of the integral mass of solidified resilient material of FIG. 5A removed from the head plate.

Referring to FIGS. 5-6 concurrently, the method will be further described. As the molten resilient material is made to solidify, the molten resilient material forms an integral mass of resilient material 220. In certain embodiments, the resilient material is a thermoplastic elastomer, although the invention is not to be so limited in all embodiments and the resilient material can be any other material that is flexible and/or resilient. The integral mass of resilient material 200 is a single, unitary piece of material formed via the injection molding technique discussed above. The integral mass of resilient material 200 generally comprises a third strip 227, a first resilient hinge 221, a first strip 225, a loop 250, a second strip 226 and a second resilient hinge 224.

The first resilient hinge 221 is the portion of the integral mass of resilient material 220 that is in the first gap 154 after the molten resilient material is injected onto the mounting plate 150 and cooled to solidify. The first resilient hinge 221 of the integral mass of resilient material 220 flexibly couples the first and second sections 151, 152 of the mounting plate 150 together. In certain embodiments, the solidified resilient material in the first gap 154 (i.e., the first resilient hinge 221 of the integral mass of resilient material 200) surrounds the first strut 164 such that the first strut 164 and the solidified resilient material in the first gap 154 collectively form the first resilient hinge. As used herein, the term "hinge" is not limited to a member that facilitates rotational movement, but also includes any movable joint or mechanism that connects linked objects together.

Furthermore, a first resilient tooth cleaning element 222 of the integral mass of resilient material 220 is a portion of the molten resilient material that flows into the first cleaning element chamber 203 and cools to solidify. The first resilient tooth cleaning element 222 extends from the second section 152 of the mounting plate 150 at the cleaning element location 183, and more specifically at the first-through hole 204 of the cleaning element location 183. In the exemplified embodiment, the first resilient tooth cleaning element 222 protrudes beyond the front surface 168 of the second section 152. The portion of the solidified resilient material that is in the second cleaning element chamber (not illustrated) forms a second resilient cleaning element 223 extending from the second section 152 of the mounting plate 150 at the second through-hole 205 of the cleaning element location 183. In the exemplified embodiment, the second resilient cleaning element 223 protrudes beyond the front surface 168 of the second section 152. The first resilient cleaning element 222 forms a first portion of the loop 250 and the second resilient cleaning element 223 forms a second portion of the loop 250. The first and second resilient cleaning elements 222, 223 are located adjacent to the island 194, and in certain embodiments each of the first and second resilient cleaning elements 222, 223 have inner surfaces that are in surface contact with the island 194. The island 194 is substantially surrounded by the loop 250 of the integral mass of resilient material 220.

The solidified resilient material in the second gap 155 forms the second resilient hinge 224 that flexibly couples the second and third sections 152, 153 of the mounting plate 150 together. In certain embodiments, the solidified resilient material in the second gap 155 surrounds the second strut 165 such that the second strut 165 and the solidified resilient material in the second gap 155 collectively form the second resilient hinge.

The solidified resilient material in the first groove 178 forms the first strip 225 extending between the first resilient hinge 221 and the first and second resilient cleaning elements 222, 223. Thus, the first strip 225 extends from the loop 250 of the integral mass of resilient material 220. The solidified resilient material in the second groove 187 forms the second strip 226 extending between the second resilient hinge 224 and the first and second resilient cleaning elements 222, 223. Thus, the second strip 226 also extends from the loop 250 of the integral mass of resilient material 220. The first and second strips 225, 226 extend from the loop 250 in opposite directions, but are aligned along the longitudinal axis A-A. The solidified resilient material in the third groove 196 forms the third strip 227 extending between the first resilient hinge 221 and the injection point 200. Thus, the third strip 227, the first resilient hinge 221, the first strip 225, the first and second resilient cleaning elements 222, 223, the second strip 226 and the second resilient hinge 224 collectively form the integral mass of resilient material 200 that is coupled to the mounting plate 150 to enhance the flexibility of the mounting plate 150 while ensuring that the mounting plate 150 maintains its integral structure.

Figure 8:
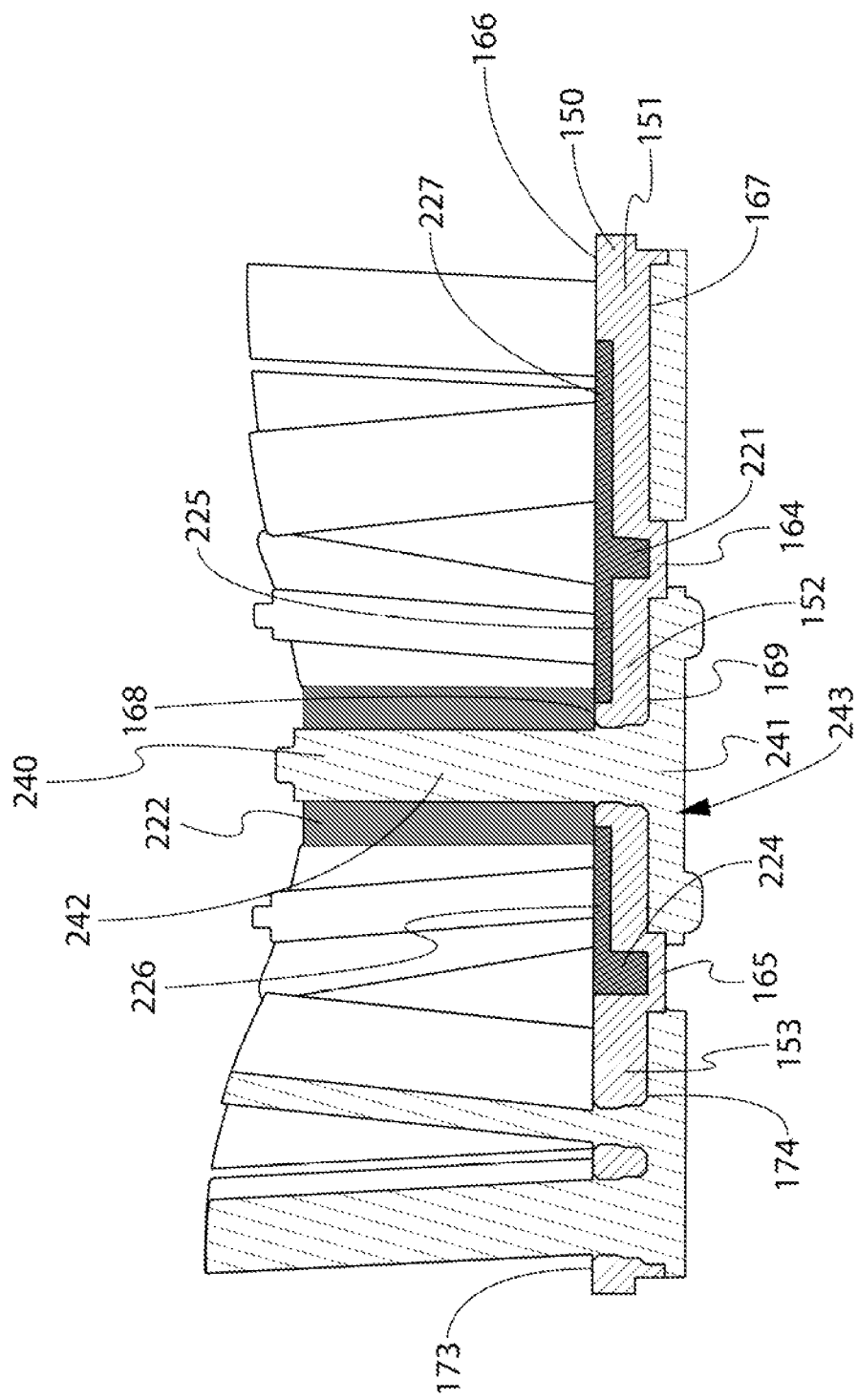
FIG. 8 is a cross-sectional view of the head plate taken along line VIII-VIII of FIG. 7.

Referring to FIGS. 5A, 5B and 8 concurrently, the first resilient hinge 221 is flush with the top surfaces 166, 168 of each of the first and second sections 151, 152 of the mounting plate 150 and is flush with the bottom surfaces 167, 169 of each of the first and second sections 151, 152 of the mounting plate 150. The second resilient hinge 224 is flush with the top surfaces 168, 173 of each of the second and third sections 152, 153 of the mounting plate 150 and is flush with the bottom surfaces 169, 174 of each of the second and third sections 152, 153 of the mounting plate 150. Furthermore, each of the first and second strips 225, 226 are flush with the front surface 168 of the second section 152 of the mounting plate 150 while the third strip 227 is flush with the front surface 166 of the first section 151 of the mounting plate 150. The strips 225, 226, 227 are not flush with the bottom surfaces 167, 169 of either of the first or second sections 151, 152 of the mounting plate 150 because the strips 225, 226, 227 are positioned within grooves that have a floor. Furthermore, although the resilient material is positioned within the gaps and grooves in the mounting plate 150, the front surfaces 166, 168, 173 of each of the first, second and third sections 151, 152, 153 of the mounting plate 150 remain exposed. Thus, the front surfaces 166, 168, 173 of each of the first, second and third sections 151, 152, 153 are not encapsulated and/or otherwise covered by the resilient material. Moreover, the island 194 also comprises a top surface 236 that is exposed and not covered by the resilient material. Thus, the grooves and gaps provide a flow path for the molten resilient material so that the molten resilient material does not solidify in a manner that covers the front surfaces 166, 168, 173 of the first second and third sections 151, 152, 153 of the mounting plate 150 or the top surface 236 of the island 194.

Figure 7:
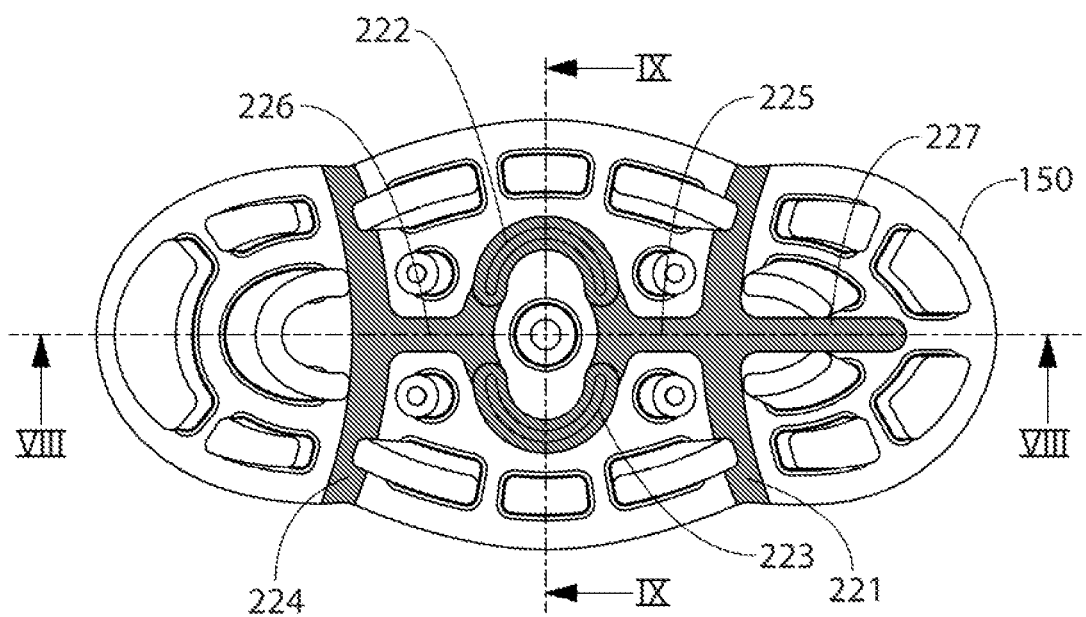
FIG. 7 is a front view of the head plate of FIG. 5A having bristle filaments mounted to the mounting plate.
Figure 9:
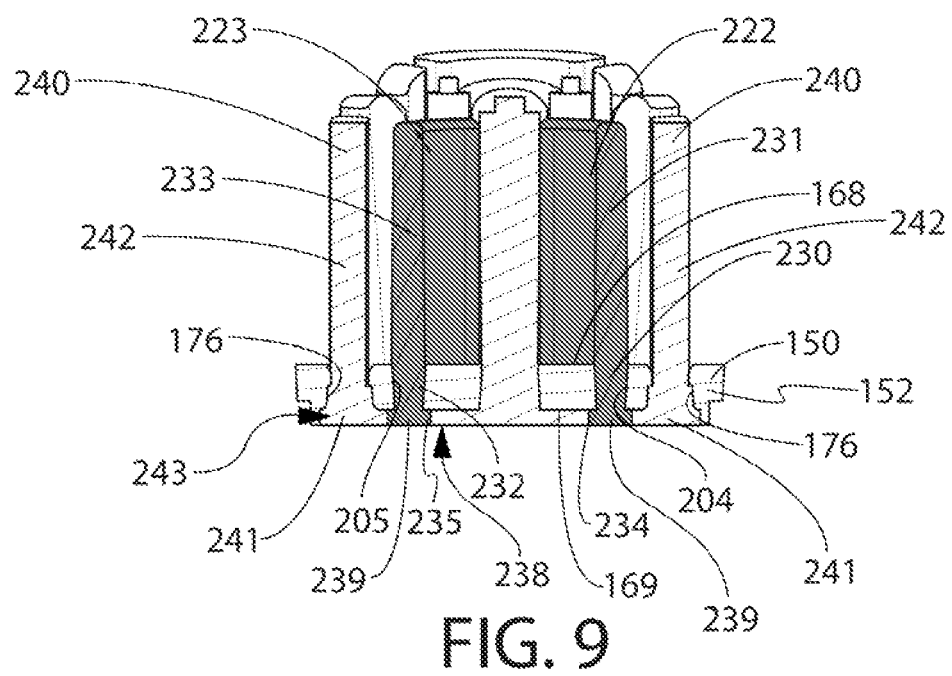
FIG. 9 is a cross-sectional view of the head plate taken along line IX-IX of FIG. 7.

Referring to FIGS. 7-9 concurrently, the method of forming a head plate having one or more tooth cleaning elements will be further described. FIGS. 7-9 include bristle tufts coupled to the mounting plate 150 as will be described in more detail below. As noted above, when the molten resilient material is injected into the mold cavity 290, the molten resilient material flows into each of the first and second through-holes 204, 205. The solidified resilient material in the first through-hole 204 forms a base portion 230 of the first resilient tooth cleaning element 222 while the solidified resilient material in the first cleaning element chamber 203 forms a tooth cleaning portion 231 of the first resilient tooth cleaning element 222. Similarly, the solidified resilient material in the second through-hole 205 forms a base portion 232 of the second resilient tooth cleaning element 223 while the solidified material in the second cleaning element chamber (not illustrated) forms a tooth cleaning portion 233 of the second resilient tooth cleaning element 223. The base portion 230 of the first resilient tooth cleaning element 222 is integrally formed with the tooth cleaning portion 231 of the first resilient tooth cleaning element 222. Similarly, the base portion 232 of the second resilient tooth cleaning element 223 is integrally formed with the tooth cleaning portion 233 of the second resilient tooth cleaning element 223.

The base portion 230 of the first resilient tooth cleaning element 222 includes an annular flange 234 that is larger than the first through-hole 204 to prevent the first resilient tooth cleaning element 222 from being pulled upwardly through the first through-hole 204 during use of an oral care implement formed using the head plate described herein. Furthermore, the base portion 232 of the second resilient tooth cleaning element 223 includes an annular flange 235 that is larger than the second through-hole 205 to prevent the second resilient tooth cleaning element 223 from being pulled upwardly through the second through-hole 205 during use of an oral care implement formed using the head plate described herein.

In the exemplified embodiment, at least a portion of the base portions 230, 232 of each of the first and second resilient tooth cleaning elements 231, 233 are exposed (i.e., exposed portions 239) via the rear surface 169 of the second section 152 of the mounting plate 150. In the exemplified embodiment, the exposed portions 239 of the base portions 230, 232 of the first and second resilient tooth cleaning elements 222, 223 protrude from the rear surface 169 of the second section 152 of the mounting plate 150. However, the invention is not to be so limited and in certain other embodiments the exposed base portions 230, 232 of the first and second resilient tooth cleaning elements 231, 233 can merely be flush with the rear surface 169 of the second section 152 of the mounting plate 150.

Still referring to FIGS. 7-9, insertion and coupling of a bristle tuft to the mounting plate 150 will be described. As noted above, the first section 151 of the mounting plate 150 comprises a plurality of tuft through-holes 175, the second section 152 of the mounting plate 150 comprises a plurality of tuft through-holes 176 and the third section 153 of the mounting plate 150 comprises a plurality of tuft through-holes 177. To attach bristle tufts 240 to the mounting plate 150, the bristle tuft 240 is inserted into each of the one or more tuft through-holes 176 of the second section 152 of the mounting plate 150. Although the discussion herein is with regard to inserting the bristle tufts 240 into the tuft through-holes 176 of the second section 152 of the mounting plate 150, it should be understood that the connection method is equally applicable to attaching bristle tufts to each of the first and third sections 151, 153 of the mounting plate 150.

The bristle tufts 240 are inserted into the tuft through-holes 176 so that a rear portion 241 of the bristle tufts 240 protrudes beyond the rear surface 169 of the second section 152 of the mounting plate 150 and a tooth cleaning portion 242 of the bristle tufts 240 protrudes beyond the front surface 168 of the second section 152 of the mounting plate 150. After insertion, the rear portions 241 of the bristle tufts 240 are melted to form a bristle melt 243. The bristle melt 243 is larger than the tuft through-holes 176 of the second section 152 of the mounting plate 150 to prevent the bristle tufts 240 from being pulled through the tuft through-holes 176 during use of an oral care implement formed using the mounting plate 150.

In the exemplified embodiment, the bristle melt 243 is coupled to the exposed portions 239 of the base portions 232 of the first and second resilient tooth cleaning elements 222, 223. Coupling of the exposed portions 239 of the resilient tooth cleaning elements 222, 223 with the bristle melt 243 forms a matte 238 that is adjacent the rear surface 269 of the second section 152. The matte 238 may include the bristle melt of multiple different bristles as well as the exposed portions 239 of multiple ones of the resilient tooth cleaning elements 222, 223. In the exemplified embodiment, the matte 238 includes the bristle melt 243 from three different bristle tufts 240 (including a bristle tuft extending from the island 194 that protrudes beyond the island's front surface 236) and the exposed portions 239 of two different resilient tooth cleaning elements 222, 223.

Figure 10:
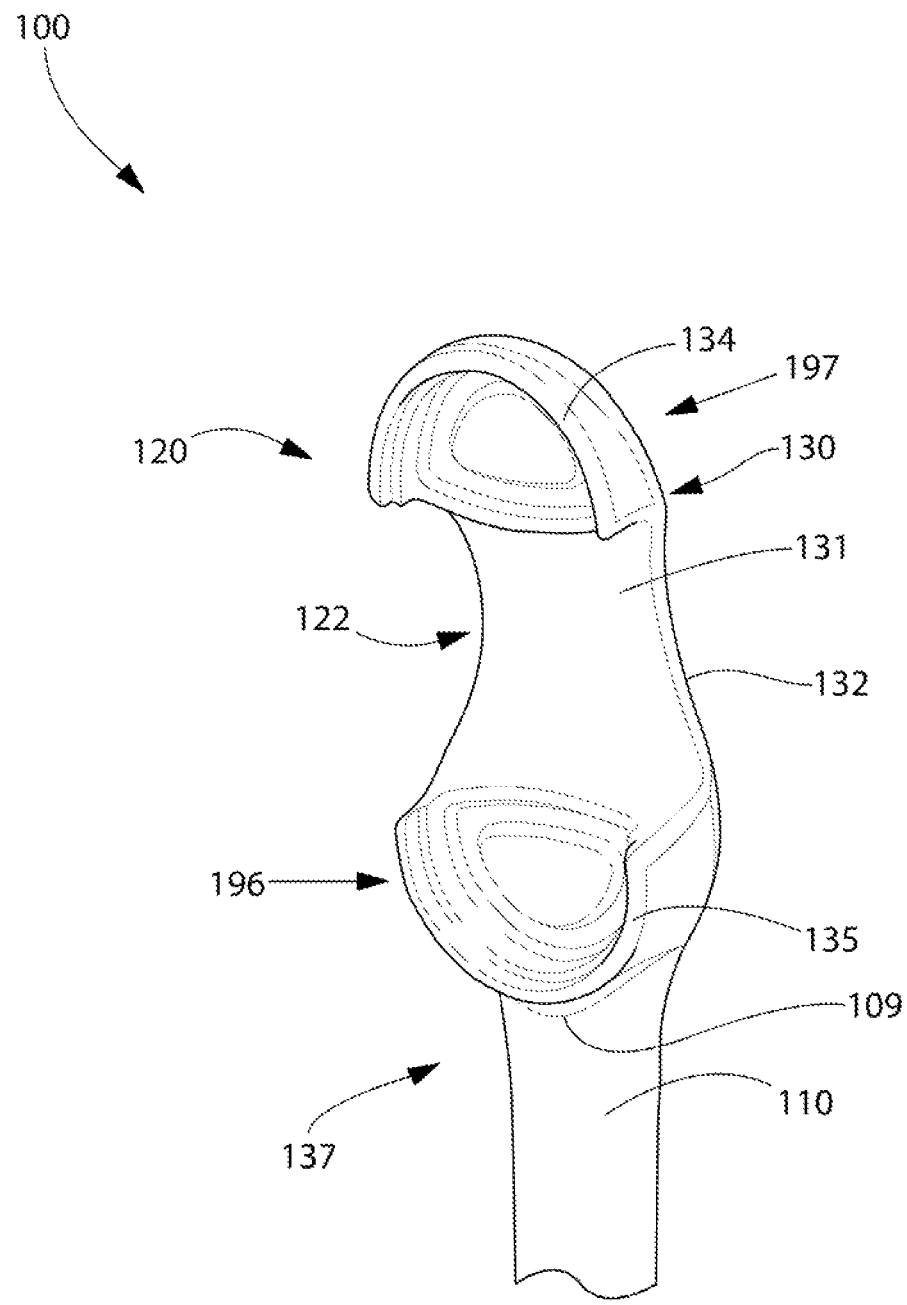
FIG. 10 is a front perspective view of a base structure of the head of the oral care implement of FIG. 1.

Referring now to FIG. 10, the head 120 of the oral care implement 100 will be further described. As noted above, the head 120 of the oral care implement 100 generally comprises the base structure 130 having a front surface 131 and an opposing rear surface 132. The base structure 130 comprises a proximal portion 196, a distal portion 197 and a narrowed waist portion 122 longitudinally positioned in between the proximal and distal portions 196, 197. Due to the narrowed waist portion 122, the base structure 130 is in the general shape of an hourglass in that it is wider at the top and bottom and narrower in the middle. In the exemplified embodiment, the base structure 130 comprises a first protuberance 134 extending upwardly from the front surface 131 of the base structure 130 at the distal portion 197 of the base structure 130 and a second protuberance 135 extending upwardly from the front surface 131 of the base structure 130 at the proximal portion 196 of the base structure 130. The first and second protuberances 134, 135 are not limited to having a rounded or semi-rounded shape but may be any shaped member extending from the front surface 131 of the base structure 130. Furthermore, although the invention is illustrated and described herein as having the first protuberance 134 and the second protuberance 135, in certain embodiments the invention may comprise only one of the protuberances extending upwardly from the front surface 131 of the base structure 130.

The base structure 130 comprises a generally U-shaped cross-section extending longitudinally from the first protuberance 134 to the second protuberance 135. The U-shaped cross-section is formed by the first and second protuberances 134, 135 extending upwardly from the front surface 131 of the base structure 130 at the proximal and distal portions 196, 197 of the base structure 130, respectively. The portion of the base structure 130 that is longitudinally positioned in between the first and second protuberances 134, 135 (i.e., the narrowed waist portion 122) does not have any component extending upward from the front surface 131 of the base structure 130, and thereby forms the bottom curved portion of the U-shape of the base structure 130. This shape of the base structure 130 facilitates movably mounting cleaning elements to the base structure 130 as will be described in more detail below.

Each of the first and second protuberances 134, 135 are formed integrally with and form a part of the base structure 130. Furthermore, the base structure 130 is formed from a rigid material such as a hard plastic (i.e., any of the hard plastic materials listed above with regard to the handle 110). Due to the integral formation of the first and second protuberances 134, 135 with the base structure 130, each of the first and second protuberances 134, 135 are substantially non-movable with respect to the base structure 130. Thus, although there is inherent flexibility in all materials, the first and second protuberances 134, 135 are substantially unable to move relative to the base structure 130 due to their hard plastic material and integral formation.

In certain embodiments, the handle 110 and the base structure 130 may be collectively referred to herein as a body 137 of the oral care implement 100. The body 137 generally comprises the elongated handle 110 and the base structure 130 which is coupled to the distal end 109 of the handle 110.

Figures 11, 11A:
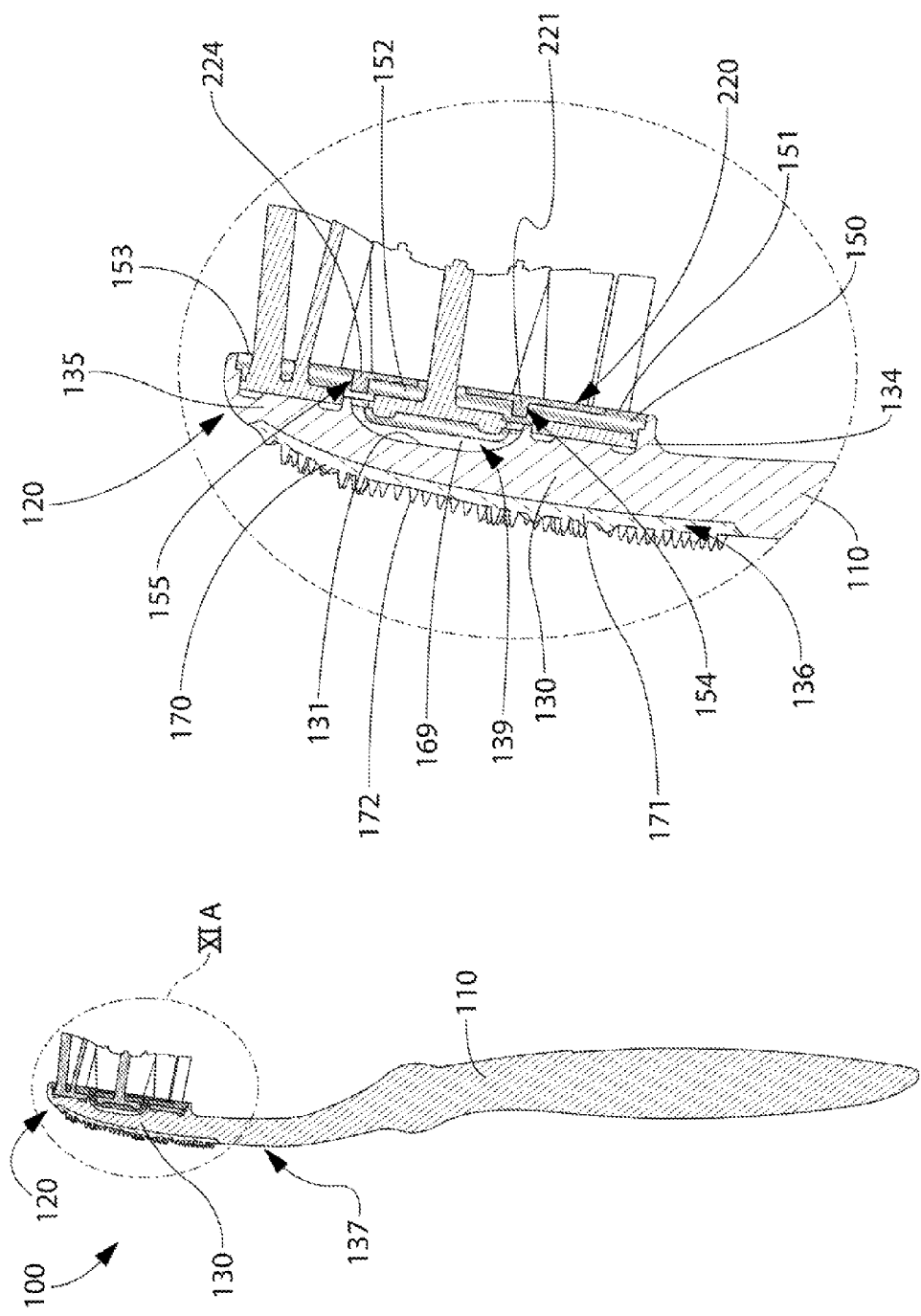
FIG. 11 is a cross-sectional view of the oral care implement taken along line XI-XI of FIG. 1.
FIG. 11A is a close-up view of area XIA of FIG. 11.

Referring to FIGS. 11-11A, forming the oral care implement utilizing the body 137 (comprising the handle 110 and the base structure 130) and the mounting plate 150 will be described. During forming of the oral care implement 100, first the body 137 of the oral care implement 100 and the mounting plate 150 are formed separately from one another. The body 137 of the oral care implement 100 can be formed from an injection molding technique or any other techniques that are known for forming handle and base structure portions of an oral care implement. Furthermore, the mounting plate 150 is formed from the methods and techniques that have been described in detail above.

Coupling of the mounting plate 150 to the base structure 130 comprises coupling the first section 151 of the mounting plate 150 to the first protuberance 134 of the base structure 130 (such as by ultrasonic welding, or any other techniques mentioned herein) so that the first section 151 of the mounting plate 150 is substantially non-movable relative to the base structure 130. Furthermore, as a result of coupling the first section 151 of the mounting plate 150 to the first protuberance 134 of the base structure 130, the second section 152 of the mounting plate 150 is movably supported above the front surface 131 of the base structure 130 such that a gap 139 exists between the rear surface 169 of the second section 152 and the front surface 131 of the base structure 130. The first resilient hinge 221 of the integral mass of resilient material 220 is positioned in the first gap 154 between the first section 151 of the mounting plate 150 and the second section 152 of the mounting plate 150. The first resilient hinge 221 facilitates the flexible coupling between the first and second sections 151, 152 of the mounting plate 150 so that the second section 152 of the mounting plate 150 is movably supported above the front surface 131 of the base structure 130.

Furthermore, in embodiments wherein the base structure 130 also comprises the second protuberance 135, the third section 153 of the mounting plate 150 is coupled to the second protuberance 135 of the base structure 130 so that the third section 153 of the mounting plate 150 is substantially non-movable relative to the base structure 130. The second resilient hinge 224 of the integral mass of resilient material 220 is positioned in the second gap 155 between the third section 153 of the mounting plate 150 and the second section 152 of the mounting plate 150. The second resilient hinge 224 facilitates the flexible coupling between the third and second sections 153, 152 of the mounting plate 150 so that the second section 152 of the mounting plate 150 is movably supported above the front surface 131 of the base structure 130.

As noted above, the oral care implement also comprises a soft tissue cleanser 170 on the rear surface 132 of the base portion 130. The soft tissue cleanser 170 comprises a pad portion 171 and a plurality of protuberances 172 protruding from the pad portion 171. The pad portion 171 of the soft tissue cleanser 170 is disposed in the basin 136. In the exemplified embodiment, each of the plurality of protuberances 172 is in the form of a nub. As used herein a "nub" generally refers to a column-like protrusion (without limitation to the cross-sectional shape of the protrusion) which is upstanding from a base surface. In a general sense, the protuberances 172 in the preferred construction have a height that is greater than the width at the base of the protuberance 172 (as measured in the longest direction). Nevertheless, protuberances or nubs could include projections wherein the widths and heights are roughly the same or wherein the heights are somewhat smaller than the base widths. Moreover, in some circumstances (e.g., where the protuberances tapers to a tip or includes a base portion that narrows to a smaller projection), the base width can be substantially larger than the height.

In one preferred arrangement of the soft tissue cleanser 170, the plurality of protuberances 172 are preferably conically shaped. As used herein, "conically shaped" or "conical" is meant to include true cones, frusto-conically shaped elements, and other shapes that taper to a narrow end and thereby resemble a cone irrespective of whether they are uniform, continuous in their taper, or have rounded cross-sections. In the exemplified embodiment, the soft tissue cleanser 170 including the pad 171 and the protuberances 172 are formed from a resilient material, such as an injection molded thermoplastic elastomer. An example of a suitable elastomeric soft tissue cleaner that may be used with the present invention and positioned on the rear surface 131 of the base structure 130 of the head 120 is disclosed in U.S. Pat. No. 7,143,462, issued Dec. 5, 2006 to the assignee of the present application, the entirety of which is hereby incorporated by reference. In certain other embodiments, the protuberances 172 of the soft tissue cleanser 170 can take the form of elongated ridges, nubs, or combinations thereof.

In certain embodiments, the base structure 130 may comprise a protuberance, such as a spherical mass of material, extending upwardly from the front surface 131 of the base structure 130 into the gap 139 between the rear surface 169 of the second section 152 of the mounting plate 150 and the front surface 131 of the base structure 130. The protuberance facilitates pivoting movement of the second section 152 of the mounting plate 150 relative to the base structure 130 by providing a mechanism on which the second section 152 of the mounting plate 150 can pivot and move.

The invention is described herein with regard to the oral care implement 100 and a method of forming the oral care implement. Furthermore, the invention is described with regard to a method of forming a head plate having one or more tooth cleaning elements. The oral care implement 100 is a structure that includes the head plate that is formed by the methods disclosed herein. Thus, where an oral care implement is claimed, the oral care implement may comprise the head plate formed by the methods described herein.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of forming a head plate having one or more tooth cleaning elements, the method comprising:
   a) forming a mounting plate, the mounting plate comprising a first section and a second section, the first section separated from the second section by a first gap, a first groove formed into a front surface of the second section that extends from the first gap to a cleaning element location of the second section;
   b) positioning the mounting plate in a mold cavity so that a first cleaning element chamber of the mold cavity is aligned with the cleaning element location;
   c) injecting a molten resilient material into the mold cavity so that the molten resilient material: (1) flows into the first gap; (2) flows into the first groove; and (3) flows into the first cleaning element chamber; and
   d) cooling to solidify the molten resilient material, wherein the solidified resilient material in the first gap forms a first resilient hinge that couples the first and second sections of the mounting plate together while the solidified resilient material in the first cleaning element chamber forms a first resilient tooth cleaning element extending from the front surface of the second section of the mounting plate at the cleaning element location.

2. The method according to claim 1 wherein step a) further comprises forming the mounting plate so that the second section comprises a first through-hole at the cleaning element location, the first groove extending from the first gap to the first through-hole; wherein step c) further comprises injecting the molten resilient material into the mold cavity so that the molten resilient material also flows into the first through-hole; and wherein step d) further comprises the solidified resilient material in the first through-hole forming a base portion of the first resilient tooth cleaning element and the solidified resilient material in the cleaning element chamber forming a tooth cleaning portion of the first resilient tooth cleaning element.

3. The method according to claim 2 wherein a portion of the base portion of the first resilient tooth cleaning element is exposed via the rear surface of the second section.

4. The method according to claim 3 wherein the second section comprises one or more tuft through-holes, the method further comprising:
   inserting a bristle tuft into each of the one or more tuft through-holes so that a rear portion of the bristle tuft protrudes beyond the rear surface of the second section and a tooth cleaning portion of the bristle tuft protrudes beyond the front surface of the second section; and
   melting the rear portion of the bristle tuft to form a bristle melt, the bristle melt being larger than the tuft through-hole in which the bristle tuft is located, the bristle melt coupled to the exposed portion of the base portion of the first resilient tooth cleaning element to form a second matte adjacent the rear surface of the second section.

5. The method according to claim 1 wherein the base portion of the first resilient tooth cleaning element and the tooth cleaning portion of the first resilient tooth cleaning element are integrally formed.

6. The method according to claim 1 wherein step d) further comprises the solidified resilient material in the first groove forming a first strip extending between the first resilient hinge and the first resilient tooth cleaning element.

7. The method according to claim 1 wherein the mounting plate comprises a longitudinal axis, the first gap extending transversely across the entire width of the mounting plate, and the first groove extends longitudinally from the first gap to the cleaning element location, the cleaning element location located in a central region of the second section.

8. The method according to claim 1 wherein step a) further comprises forming the mounting plate to include a third section separated from the second section by a second gap, and a second groove formed into the front surface of the second section that extends from the cleaning element location to the second gap; and wherein step c) further comprises injecting the molten resilient material into the mold cavity so that the molten resilient material also flows into the second groove and into the second gap; and wherein step d) further comprises the solidified resilient material in the second gap forming a second resilient hinge that flexibly couples the second and third sections together.

9. The method according to claim 8 wherein step d) further comprises the solidified resilient material in the second groove forming a second strip extending between the second resilient hinge and the first resilient tooth cleaning element.

10. The method according to claim 9 wherein the first groove and the second groove extend along a longitudinal axis of the mounting plate from opposite sides of the cleaning element location.

11. The method according to claim 1 further comprising:
   e) inserting one or more bristle tufts into one or more tuft through-holes formed in the second section of the mounting plate, a tooth cleaning portion of the one or more bristle tufts protruding from the front surface of the second section.

12. The method according to claim 1 wherein step a) further comprises forming the mounting plate so that a third groove is formed into a front surface of the first section, the third groove extending from the first gap, and wherein step c) further comprises injecting the molten resilient material into the mold cavity so that the molten resilient material also flows into the third groove.

13. The method according to claim 1 wherein step a) further comprises forming the mounting plate so that the second section comprises an island in the cleaning element location; wherein step b) comprises positioning the mounting plate in the mold cavity so that the first cleaning element chamber of the mold cavity and a second cleaning element chamber of the mold cavity are aligned with the cleaning element location and adjacent the island; wherein step c) further comprises injecting the molten resilient material into the mold cavity so that the molten resilient material also flows into the second cleaning element chamber, and wherein step d) further comprises the solidified resilient material in the second cleaning element chamber forming a second resilient tooth cleaning element extending from the second section of the mounting plate at the cleaning element location, the first and second resilient tooth cleaning elements located adjacent the island.

14. The method according to claim 13 wherein the first and second resilient tooth cleaning elements are located on opposite sides of the island.

15. The method according to claim 13 wherein step c) further comprises injecting the molten resilient material into the mold cavity so that the molten resilient material flows through the first groove into the first and second cleaning element chambers.

16. The method according to claim 1 wherein step a) further comprises forming the mounting plate so that the mounting plate comprises a first strut in the first gap, the first strut having a first end connected to the first section and a second end connected to the second section; and wherein step c) further comprises injecting the molten resilient material into the mold cavity so that the molten resilient material flows into the first gap to surround the first strut, and wherein the first strut and the solidified resilient material in the first gap collectively form the first resilient hinge.

17. The method according to claim 1 wherein step c) is performed in a single injection step.

18. The method according to claim 1 wherein step c) is performed using a single injection point.

19. A head plate manufactured by the method according to claim 1.

20. A method of forming an oral care implement comprising:
   a) forming a body comprising an elongated handle and a base structure coupled to a distal end of the elongated handle;
   b) forming a head plate comprising:
      a mounting plate, the mounting plate comprising a first section and a second section, the first section separated from the second section by a first gap, a first groove formed into a front surface of the second section extending from the first gap to a cleaning element location of the second section; and
      an integral mass of a resilient material comprising a first resilient hinge in the first gap that flexibly couples the first and second sections together, a first resilient tooth cleaning element extending from the front surface of the second section at the cleaning element location, and a first resilient strip in the first groove extending between the first resilient tooth cleaning element and the first resilient hinge; and
   c) coupling the head plate to the base structure, the head plate and the base structure forming a head of the oral care implement.

21. The method according to claim 20 wherein the base structure comprises a front surface, a rear surface, and a first protuberance extending from the front surface of the base structure; and wherein step c) further comprises coupling the first section of the head plate to the first protuberance of the base structure so that the first section is substantially non-movable relative to the base structure and the second section is movably supported above the front surface of the base structure, a gap existing between the second section and the front surface of the base structure.

22. The method according to claim 21 further:
   wherein the base structure comprises a second protuberance extending from the front surface of the base structure;
   wherein the mounting plate further comprises a third section separated from the second section by a second gap and a second groove formed into the front surface of the second section extending from the cleaning element location to the second gap;
   wherein the integral mass further comprises a second resilient hinge in the second gap that flexibly couples the second and third sections together, and a second resilient strip in the second groove extending between the first resilient tooth cleaning element and the second resilient hinge; and
   wherein step c) further comprises coupling the third section to the second protuberance of the base structure so that the third section is substantially non-movable relative to the base structure and the second section is movably supported above the front surface of the base structure by the first and second sections via the first and second resilient hinges.

23. The method according to claim 20 further:
   wherein the second section comprises a first through-hole at the cleaning element location, the first resilient tooth cleaning element extending through the first through-hole so that a portion of the first resilient tooth cleaning element is exposed on a rear surface of the second section;
   wherein the second section further comprises a plurality tuft through-holes;
   wherein the head plate further comprises a bristle tuft extending through each one of the tuft through-holes, each of the bristle tufts comprising a rear portion that protrudes beyond the rear surface of the second section and a tooth cleaning portion that protrudes beyond the front surface of the second section, the rear portions of the bristle tuft and the exposed portion of the first resilient tooth cleaning element melted together to form a matte adjacent the rear surface of the second section.

24. The method according to claim 20 wherein step b) further comprises:
b-1) forming the mounting plate;
b-2) positioning the mounting plate in a mold cavity so that a first cleaning element chamber of the mold cavity is aligned with the cleaning element location;
b-3) injecting a molten resilient material into the mold cavity so that the molten resilient material: (1) flows into the first gap; (2) flows into the first groove; and (3) flows into the first cleaning element chamber; and
b-4) solidifying the molten resilient material by cooling, thereby forming the integral mass of resilient material.

25. An oral care implement comprising:
a handle;
a base structure coupled to a distal end of the handle;
a head plate comprising:
a mounting plate comprising a first section and a second section, the first section separated from the second section by a first gap, a first groove formed into a front surface of the second section extending from the first gap to a cleaning element location on the front surface of the second section; and
an integral mass of a resilient material comprising a first resilient hinge in the first gap that flexibly couples the first and second sections of the plate together, a first resilient tooth cleaning element extending from the front surface of the second section at the cleaning element location, and a first resilient strip in the first groove extending between the first resilient tooth cleaning element and the first resilient hinge; and
the head plate coupled to the base structure so that the first section is substantially non-movable relative to the base structure and the second section is movable relative to the base structure via flexure at the first resilient hinge.

26. The oral care implement according to claim 25 wherein the base structure comprises a front surface, a rear surface, and a first protuberance extending from the front surface of the base structure; and wherein the first section is coupled to the first protuberance of the base structure and the second section is supported above the front surface of the base structure, a gap existing between the second section and the front surface of the base structure.

27. The oral care implement according to claim 25 wherein the base structure comprises a second protuberance extending from the front surface of the base structure; wherein the mounting plate further comprises a third section separated from the second section by a second gap and a second groove formed into the front surface of the second section extending from the cleaning element location to the second gap; wherein the integral mass further comprises a second resilient hinge in the second gap that flexibly couples the second and third sections together, and a second resilient strip in the second groove extending between the first resilient tooth cleaning element and the second resilient hinge; and wherein the third section is coupled to the second protuberance of the base structure so that the third section of the head plate is substantially non-movable relative to the base structure and the second section is movably supported above the front surface of the base structure by the first and second sections via the first and second resilient hinges.

28. The oral care implement according to claim 25 wherein the resilient material is a thermoplastic material and wherein the rigid material is hard plastic.

29. The oral care implement according to claim 25 wherein the mounting plate further comprises a first strut in the first gap, the first strut having a first end connected to the first section and a second end connected to the second section.

30. The oral care implement according to claim 25 wherein the first gap extends transversely across an entire width of the mounting plate and the first groove extends longitudinally from the first gap.

31. The oral care implement according to claim 25 wherein the cleaning element location is a central region of the second section.

32. The oral care implement according to claim 25 wherein the second section comprises an island surrounded by a loop of the integral mass of resilient material.

33. The oral care implement according to claim 32 wherein the first resilient tooth cleaning element forms a first portion of the loop and the first resilient strip extends from the loop.

34. The oral care implement according to claim 33 wherein the integral mass of resilient material further comprises a second resilient tooth cleaning element extending from the second section at the cleaning element location, and wherein the second resilient tooth cleaning element forms a second portion of the loop.

35. The oral care implement according to claim 32 wherein the second section comprises a second groove formed into the front surface of the second section extending from the cleaning element location, wherein the integral mass of resilient material further comprises a second strip in the second groove, the second strip extending from the loop.

36. The oral care implement according to claim 35 wherein the first and second resilient strips are aligned along a longitudinal axis of the head plate.

37. The oral care implement according to claim 36 wherein the first and second resilient tooth cleaning elements are located on opposite sides of the longitudinal axis of the head plate.

38. The oral care implement according to claim 32 further comprising a bristle tuft extending from the island.

39. The oral care implement according to claim 25 wherein the mounting plate further comprises a third groove formed into the front surface of the first section, the third groove extending from the first gap; and wherein the integral resilient material further comprises a third resilient strip in the third grove.

40. A method of forming a head plate having one or more tooth cleaning elements, the method comprising:
a) forming a mounting plate of a rigid material having a first groove formed into a front surface of the mounting plate that extends from an injection location to a cleaning element location;
b) positioning the mounting plate in a mold cavity so that a first cleaning element chamber of the mold cavity is aligned with the cleaning element location and an injection port of the mold cavity is aligned with the injection location;
c) injecting a molten resilient material into the mold cavity via the injection port so that the molten resilient material: (1) flows into the first groove; and (2) flows into the first cleaning element chamber; and
d) cooling to solidify the molten resilient material, wherein the solidified resilient material in the first cleaning element chamber forms a first resilient tooth cleaning element extending from the front surface of the mounting plate at the cleaning element location, and the solidified resilient material in the first groove forms a first resilient strip that extends from the injection location to the first resilient tooth cleaning element.

\* \* \* \* \*